United States Patent [19]
Hedden

[11] Patent Number: 4,915,634
[45] Date of Patent: Apr. 10, 1990

[54] VISUAL AND MANIPULATIVE TEACHING AID FOR MATHEMATICS

[76] Inventor: Brenda Hedden, P.O. Box 225 A, Staffordville, Conn. 06077

[21] Appl. No.: 318,960

[22] Filed: Mar. 6, 1989

[51] Int. Cl.$^4$ .............................................. G09B 19/02
[52] U.S. Cl. .................................... 434/209; 434/199; 434/205
[58] Field of Search .............. 434/191, 199, 205, 209; 350/167; 351/167

[56] References Cited

U.S. PATENT DOCUMENTS

| | | | |
|---|---|---|---|
| 1,941,733 | 1/1934 | Badanes | 434/199 |
| 3,172,599 | 3/1965 | Passerimi | 434/209 X |
| 3,245,745 | 4/1966 | Hancock | 351/167 |
| 3,289,326 | 12/1966 | Bender | 434/312 |
| 3,435,541 | 4/1969 | Tacey | 434/199 |
| 4,241,522 | 12/1980 | Jablonski | 434/199 X |

*Primary Examiner*—William H. Grieb
*Attorney, Agent, or Firm*—Chapin, Neal & Dempsey

[57] ABSTRACT

A teaching aid includes a plurality of lenses arranged in an array and mounted within a frame member. A slide channel is disposed along the edges of the frame and is imprinted along one edge with numbers from one to ten. A panel having an index mark is slidably disposed in the slide channels and is movable with respect to the lenses to uncover a specified number of lenses equal to the number disposed in alignment with the indicator mark. Each of the lenses has a cross-section providing a wide field of vision.

7 Claims, 1 Drawing Sheet

U.S. Patent   Apr. 10, 1990   4,915,634
FIG. 1
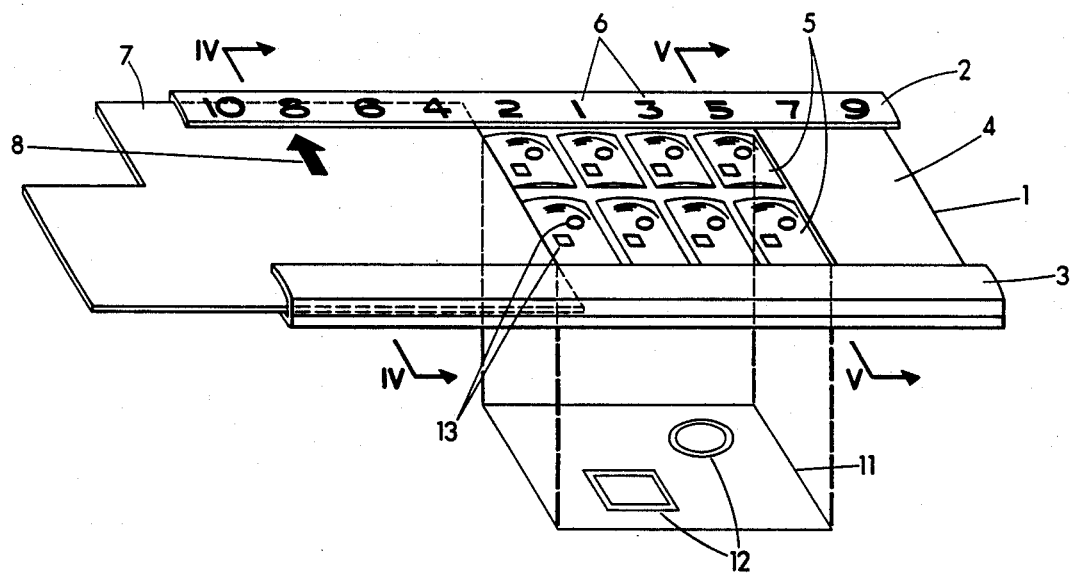
FIG. 2
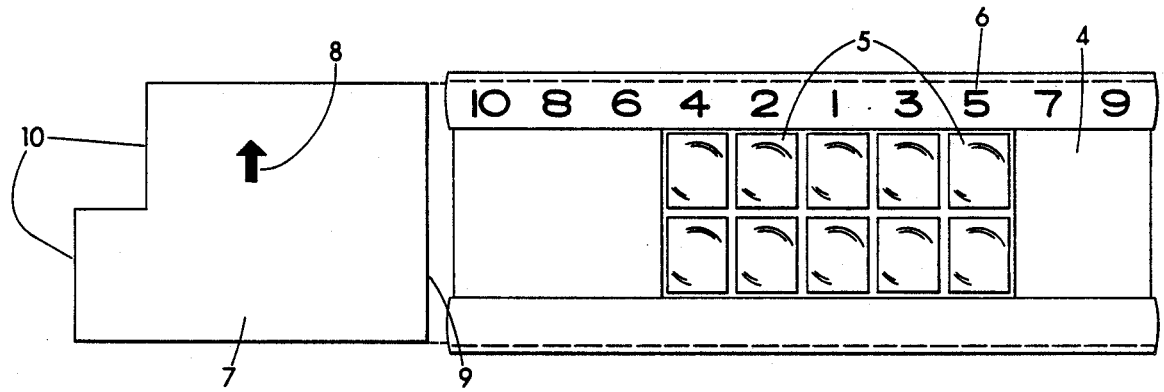
FIG. 3
FIG. 4
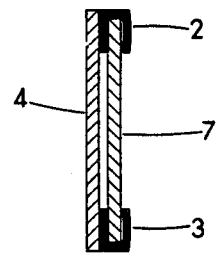
FIG. 5
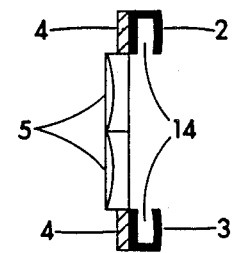

VISUAL AND MANIPULATIVE TEACHING AID FOR MATHEMATICS

BACKGROUND OF THE INVENTION

Multiplication and division teaching aids have been on the market for many years. The prior devices teach multiplication mainly by memorization. These devices embody the same basic learning process as involved with multiplication flash-cards. Children generally learn the multiplication tables by rote memory before they conceptualize the multiplication process.

Although the use of multiplication teaching aids are well known as in Jablonski U.S. Pat. No. 4,241,522; Tacey U.S. Pat. No. 3,435,541 and Passerini U.S. Pat. No. 3,172,599 which disclose multiplication and division teaching aids, the user only sees the numbers multiplied and the final product and not the basis for understanding the process. Similarly, in division, the user only sees the numerator, denominator and quotient without visualizing the process.

The present invention comprises a visual and manipulative aid to assist in teaching the multiplication and division processes by actual visual presentation. The device constitutes a plurality of lenses mounted within a frame and an opaque lens cover or panel which is slidable in the frame to uncover a selected number of lenses. The number of lenses uncovered corresponds to the multiplier. Small objects which correspond to the multiplicand are placed in the field of vision of the lens array. The child can determine the product by counting the total number of images which can be seen through each of the uncovered lenses. By simply counting the objects seen, children can begin to appreciate the relationship of multiplication and addition. Division can also be taught by simply reversing the multiplication process.

The principal object of this invention is to provide a new and useful visual aid to teach children multiplication and division by conceptualization and manipulation, not by rote memory.

Another object of this invention is to provide a teaching aid of the above type which is easily and inexpensively formed from a set of lenses, a simple frame and a lens cover slide. Students can make their own multiplication and division tables by utilizing the lense sets.

The above and other objects and advantages of this invention will be more readily apparent from the following description read in conjunction with the accompanying drawings, in which:

FIG. 1 is a perspective view of a visual teaching aid of the type embodying this invention, with two objects in the field of view of the device;

FIG. 2 is a top plan view of the slide member of the visual aid;

FIG. 3 is a top plan view of the visual aid with the slide member removed therefrom;

FIG. 4 is a sectional view as taken on lines IV—IV of FIG. 1, and

FIG. 5 is a sectional view as taken on lines V—V of FIG. 1.

The visual and manipulative teaching aid for mathematics 1 is shown in FIG. 1. A plurality of wide angle, plano-concave lenses 5 are mounted within a frame 4. A panel 7 is slidably mounted on the device such that any specified number of lenses may be uncovered by movement of slide panel 7. A child can multiply by having the multiplier correspond to the number of uncovered lenses, the multiplicand being the number of objects 12 in the field of vision 11, and the product being the total number of images in all the uncovered lenses 13. As illustrated in FIG. 1, a child can be taught, for example, that two (objects 12) times eight equals sixteen by counting the images as seen through the wide angle lenses.

The ten lenses shown in the present embodiment are arranged in a side-by-side array of two rows of five lenses in each row, as best shown in FIG. 3. The array may be formed by bonding together individual lenses by any suitable means.

The construction section of the device is best shown in FIGS. 4 and 5. The device comprises a backing panel or frame 4 which extends over the entire longitudinal and lateral dimension of the frame, except a rectangular cutout in the center portion into which fits the rectangular lens array. Attached to the frame 4 along its upper and lower edges in FIG. 4 is an upper channel 2 and a lower channel 3. The two channels 2 and 3 open inwardly to provide a track in which panel 7 is slidable from side-to-side to mask and unmask any selected number of lenses. The upper channel 2 has numbers from 1 to 10 printed on it, as best shown at 6 in FIG. 3. The odd numbers are imprinted on the right side of the device starting with number 1 in the center of the lens array. The even numbers are disposed on the left side of the device. The numbers are laterally spaced apart a distance equal to the center-to-center distance between adjacent pairs of lenses.

The slide panel or lens cover 7 is shown in FIGS. 1 and 2. The right-hand edge of the lens cover slide is formed as a straight line which is perpendicular to its upper edge to expose or unmask an even number of lenses. The left side of said slide has a stepped edge or cutout portion 10, whereby only odd numbers of lenses will be uncovered. When the cover slide panel 7 is moved to the right such that the uncovered lenses will appear to the left of the slide panel.

The lenses 5 are wide angle lenses of plano-concave shape, as shown in FIG. 5 and each lens has a field of vision as wide as the overall field of vision of the complete lens array. In this way, all the objects in the field of vision can be viewed by each of the lenses individually and all the lenses collectively.

An index mark or arrowhead 8 is printed in the upper surface of panel 7 adjacent its upper edge. The mark is centrally located between the two vertical outer edge portions of the panel. As a result of the location of arrowhead 8, spacing of the numbers and the lenses 5, when the index mark is aligned with any number from 1 to 10, the number will correspond to the number of lenses uncovered.

For multiplication, a number of objects 12, such as buttons, tabs, coins, etc. may be placed on any flat surface. The teaching aid is positioned over the objects, placed close together, such that an image 13 of all of the objects will appear in each of the uncovered lenses. The user may hold the device 1 in one hand and move the slide panel 7 with the other hand until the index pointer 8 points to any number corresponding to the multiplier which is also the number of lenses uncovered by the panel 7. The user obtains the product by counting the total number of images which appear in all of the unmasked lenses. Thus, in the illustrated example, of 8×2, the user would simultaneously see and count sixteen objects.

With usage of this teaching aid, a child will be utilizing his or her visual and tactile senses by manipulation of the objects 12 and by moving the slide panel 7 while viewing the objects, whereby it will be recognized that multiplication is but a form of addition. It is recommended that this device be used in conjunction with standard multiplication tables wherein the child fills in the product when the multiplier and multiplicand are given.

The table and the teaching aid can also be used to teach division which is based on the principle that division is the reverse of the multiplication process. The "devisee" is the total number of objects seen through the lens array; the "divisor" is the number pointed to by index mark 8 on the panel 7; and, the "quotient" is the number of objects per se, or as seen through one lens. Thus, in the illustrated example 16÷8=2.

Having thus described by invention, what is claimed is:

1. A visual and manipulative aid for teaching multiplication and division comprising an array of wide angle lenses arranged in side-by-side relationship, each of the lenses having a field of vision when stationary which corresponds to the field of vision of the lens array whereby objects disposed thereunder are all simultaneously visible through each of the lenses, and a cover panel slidably disposed above said lenses to selectively cover from one to all of said lenses.

2. A visual and manipulative teaching aid, as set forth in claim 1, including a row of numbers corresponding to the number of lenses in the array, an index mark on the slide panel disposed for alignment with any one of said numbers, the cover panel having a shape and size to uncover lenses for viewing therethrough, the uncovered lenses corresponding in number to the number with which said index mark is aligned.

3. A visual and manipulative teaching aid, as set forth in claim 2, wherein the lens array includes two rows of five lenses arranged in laterally adjacent pairs.

4. A visual and manipulative teaching aid, as set forth in claim 3, wherein the lenses are plano-concave.

5. A visual and manipulative teaching aid, as set forth in claim 3, in which said numbers are disposed along one edge in spaced relation generally equal to the center-to-center distance between adjacent lenses in each row, the index mark being disposed at approximately the center as measured between the lateral edges of the slide panel, said panel having a cutout at one edge, corresponding to the shape of one of said lenses for odd number multiplcation problems.

6. A visual and manipulative teaching aid, as set forth in claim 5, in which the edge of said cover panel opposite the cutout extends straight across the rows of lenses to uncover pairs of lenses simultaneously.

7. A visual and manipulative teaching aid, as set forth in claim 6, in which said members are from one to ten with the odd number disposed along the end of the teaching aid opposite the cutout and the even numbers are disposed along the opposite end thereof with the numbers increasing in value sequentially from the center thereof.

* * * * *